United States Patent
Guisti

(10) Patent No.: US 10,298,745 B2
(45) Date of Patent: May 21, 2019

(54) METHOD AND APPARATUS FOR MODIFYING INTERACTION WITH A MOBILE-DEVICE

(71) Applicant: Ralph Peter Guisti, Belchertown, MA (US)

(72) Inventor: Ralph Peter Guisti, Belchertown, MA (US)

(*) Notice: Subject to any disclaimer, the term of this patent is extended or adjusted under 35 U.S.C. 154(b) by 0 days.

(21) Appl. No.: 16/115,200

(22) Filed: Aug. 28, 2018

(65) Prior Publication Data

US 2018/0367665 A1    Dec. 20, 2018

Related U.S. Application Data

(60) Provisional application No. 62/551,552, filed on Aug. 29, 2017.

(51) Int. Cl.
| | |
|---|---|
| *H04M 1/725* | (2006.01) |
| *H04W 4/02* | (2018.01) |
| *G06F 3/01* | (2006.01) |
| *G01S 19/25* | (2010.01) |

(52) U.S. Cl.
CPC ....... *H04M 1/72577* (2013.01); *G01S 19/252* (2013.01); *G06F 3/013* (2013.01); *H04W 4/027* (2013.01); *H04M 1/72569* (2013.01); *H04M 2250/52* (2013.01)

(58) Field of Classification Search
CPC ......... H04M 1/72577; H04M 1/72569; H04M 2250/52; H04W 4/027; G06F 3/013; G01S 19/252
USPC ....................................................... 455/418
See application file for complete search history.

(56) References Cited

U.S. PATENT DOCUMENTS

2018/0368095 A1* 12/2018 Xu ................ H04W 64/00

* cited by examiner

*Primary Examiner* — Inder P Mehra
(74) *Attorney, Agent, or Firm* — Jack Ivan Jmaev

(57) ABSTRACT

Interaction with a handheld device is modified based upon the speed at which the handheld device is traveling, for example while being held in a passenger vehicle. If the handheld device appears to be moving faster than a pre-established threshold, a lockout flag indicates that interaction with the user must be modified. Then, the lockout flag is cleared only when the handheld device is held off at an angle and the user focuses gaze upon the display for a minimum amount of time. Once the lockout flag is cleared, interaction with the user returns to a normal state.

31 Claims, 14 Drawing Sheets

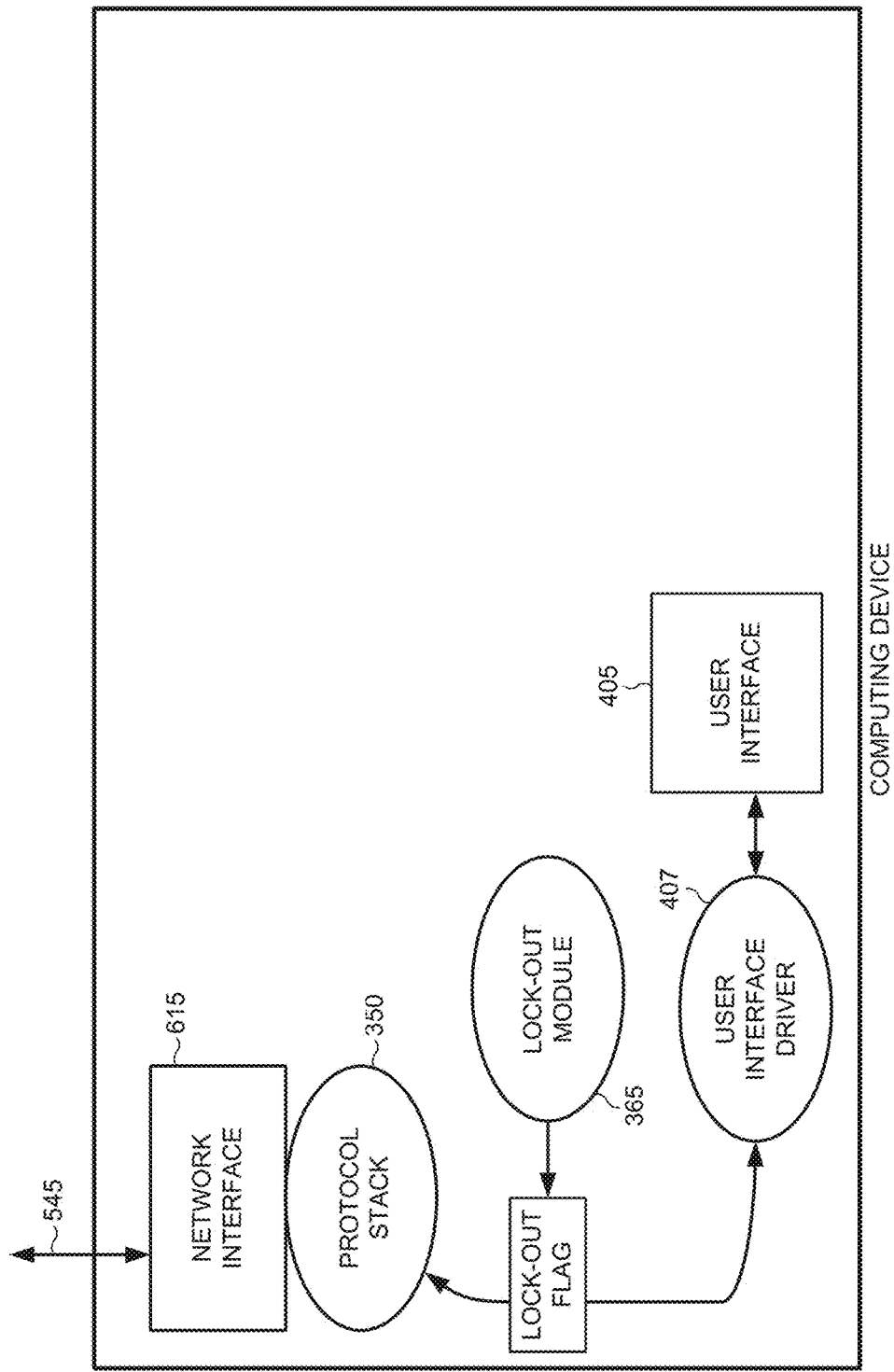

METHOD AND APPARATUS FOR MODIFYING INTERACTION WITH A MOBILE-DEVICE

RELATED APPLICATIONS

The present application claims priority to U.S. Provisional Application Ser. No. 62/551,552 filed on Aug. 29, 2017 and entitled "NOVEL MOBILE HANDHELD COMPUTING DEVICE LOCK-OUT", by Guisti, the text and figures of which are incorporated into this application in their entirety.

BACKGROUND

Handheld computing devices ("handheld devices") are commonplace. These handheld devices are exceptionally powerful computers that include tremendous processing capabilities and typically include network access facilities that let people retrieve information and to communication using email, messaging and voice channels. One example of such a handheld computing device is a cellular telephone ("cell phone"). A modern cell phone includes a processor, memory and various applications that can be executed by a user.

Because these handheld devices are so portable, people can use them when they are driving in a car, or riding on a train or bus. As with any technology, improper use can lead to hazardous consequences. For example, when a user is driving a car, any attention diverted away from the road can result in traffic collisions with other motorists, pedestrians or other obstacles. It is now apparent that cell phones, when used by a driver in a vehicle, can cause such diversion of attention that safety of all is compromised.

The use of handheld devices while driving has not gone unnoticed in society. Alarming accident statistics have caused many jurisdictions to enact laws prohibiting the use of cell phones while driving. It should be appreciated that most jurisdictions do allow "hand-free" operation of cell phones, but this still permits drivers to use a cell phone, or other handheld device using voice commands. Even with the advent of voice-enabled cell phones, some cell phone functions still require a great deal of attention, attention that a should otherwise be directed toward vehicle safety.

BRIEF DESCRIPTION OF THE DRAWINGS

Several alternative embodiments will hereinafter be described in conjunction with the appended drawings and figures, wherein like numerals denote like elements, and in which:

FIGS. 18 and 19 collectively constitute a data flow diagram that illustrates how this example embodiment of a computing device affects modification of user interaction according to its own movement.

DETAILED DESCRIPTION

In the interest of clarity, several example alternative methods are described in plain language. Such plain language descriptions of the various steps included in a particular method allow for easier comprehension and a more fluid description of a claimed method and its application. Accordingly, specific method steps are identified by the term "step" followed by a numeric reference to a flow diagram presented in the figures, e.g. (step 5). All such method "steps" are intended to be included in an open-ended enumeration of steps included in a particular claimed method. For example, the phrase "according to this example method, the item is processed using A" is to be given the meaning of "the present method includes step A, which is used to process the item". All variations of such natural language descriptions of method steps are to be afforded this same open-ended enumeration of a step included in a particular claimed method.

Unless specifically taught to the contrary, method steps are interchangeable and specific sequences may be varied according to various alternatives contemplated. Accordingly, the claims are to be construed within such structure. Further, unless specifically taught to the contrary, method steps that include the phrase " . . . comprises at least one or more of A, B, and/or C . . . " means that the method step is to include every combination and permutation of the enumerated elements such as "only A", "only B", "only C", "A and B, but not C", "B and C, but not A", "A and C, but not B", and "A and B and C". This same claim structure is also intended to be open-ended and any such combination of the enumerated elements together with a non-enumerated element, e.g. "A and D, but not B and not C", is to fall within the scope of the claim. Given the open-ended intent of this claim language, the addition of a second element, including an additional of an enumerated element such as "2 of A", is to be included in the scope of such claim. This same intended claim structure is also applicable to apparatus and system claims.

Figure 1A:
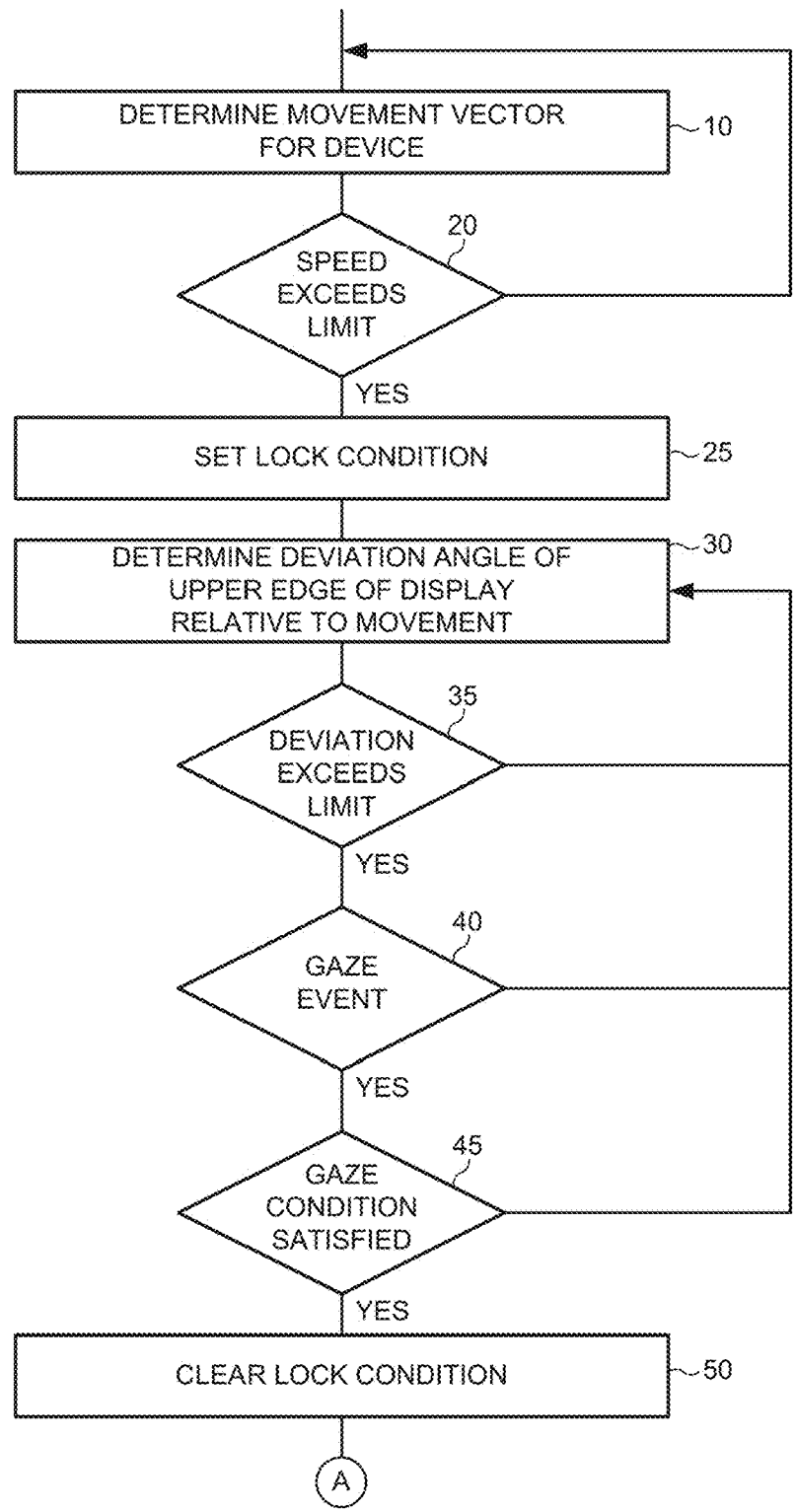
FIGS. 1A and 1B collectively comprise a flow diagram that depicts one example method for modifying interaction with a user of a hand-held device.
Figure 1B:
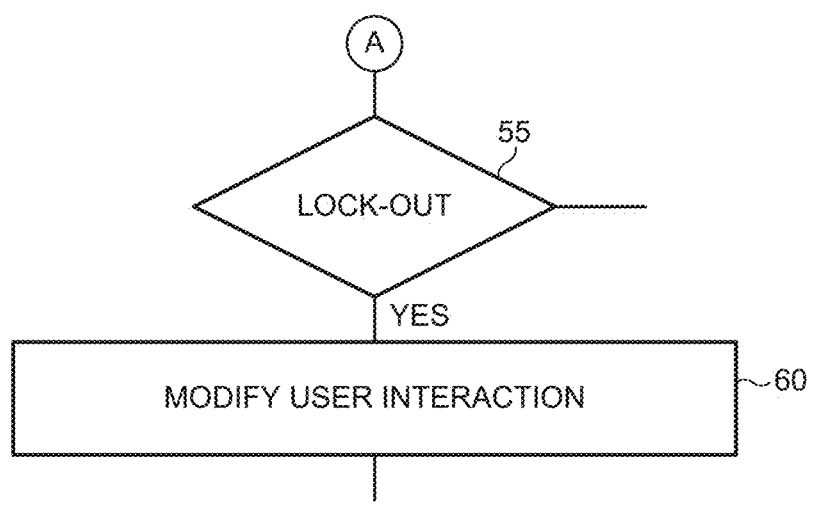

FIGS. 1A and 1B collectively comprise a flow diagram that depicts one example method for modifying interaction with a user of a hand-held device. According to this example method, modifying interaction with a user comprises method steps including determining a movement vector for the handheld device (step 10), establishing a lockout condition (step 25) when a speed component of the movement for vector exceeds a pre-established threshold (step 20), determining a deviation angle of an upper edge of a display included in the handheld device relative to the direction component of the movement vector (step 30), recognizing a gaze characteristic (step 40) when the deviation exceeds a pre-established threshold (step 35), and clearing the lockout condition (step 50) when the gaze event conforms to a pre-established condition (step 45). This example method further includes a step for modifying user interaction (step 60) when the lockout condition is active (step 55).

According to one illustrative use case of the present example method, a handheld device includes a processor that executes a particular functional software module in order to interact with hardware included in the handheld device. Accordingly, as the processor in the handheld device, according to this illustrative use case, executes the particular functional software module, it determines a movement vector according to hardware sensors included in the handheld device. It should also be noted that this particular functional software module is stored in a memory, which is also included in the handheld device and accessible by the processor for the purpose of retrieving instructions and/or storing data.

Figure 2:
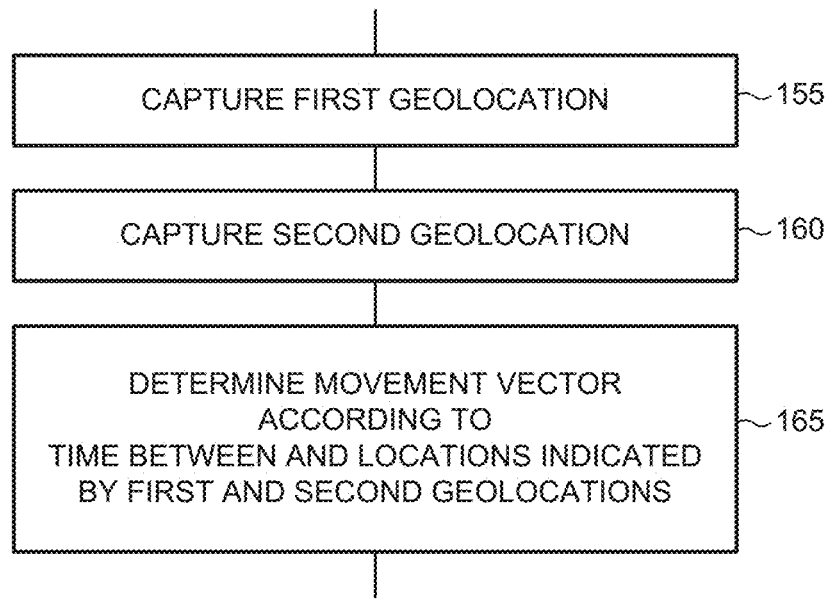
FIG. 2 is a flow diagram that depicts one alternative example method for determining a movement vector based on the location of a handheld device.

FIG. 2 is a flow diagram that depicts one alternative example method for determining a movement vector based on the location of a handheld device. According to this alternative example method, determining a movement vector comprises ascertaining a first geolocation of the handheld device (step 155), capturing a second geolocation of the handheld device (step 160), and a determining a movement vector according to the first geolocation and the second geolocation and the amount of time elapsed between the first and second geolocation (step 165).

It should likewise be appreciated that, according to one illustrative use case, this alternative example method for determining a movement vector is implemented as a particular functional software module executed by a processor included in the handheld device. Accordingly, this illustrative use case provides that the processor executes a particular functional software module in order to interact with a geolocation element included in the handheld device. According to various illustrative use cases, such a geolocation element comprises at least one or more of a global positioning system (GPS) receiver, a wide area augmentation GPS system receiver (GPS/WAAS), and/or a global navigation satellite system (GLONASS). According to yet another illustrative use case, a geolocation element comprises a data carriage included in a cellular telephone. In this alternative illustrative use case, the processor, when executing a particular functional module, obtains information from a cellular system in order to ascertain the position of the handheld device relative to a particular cellular telephone tower. It should likewise be appreciated that such a cellular telephone tower includes hardware to interact with the cellular telephone and provide cellular telephony and data services to a user of a cellular telephone.

Figure 3:
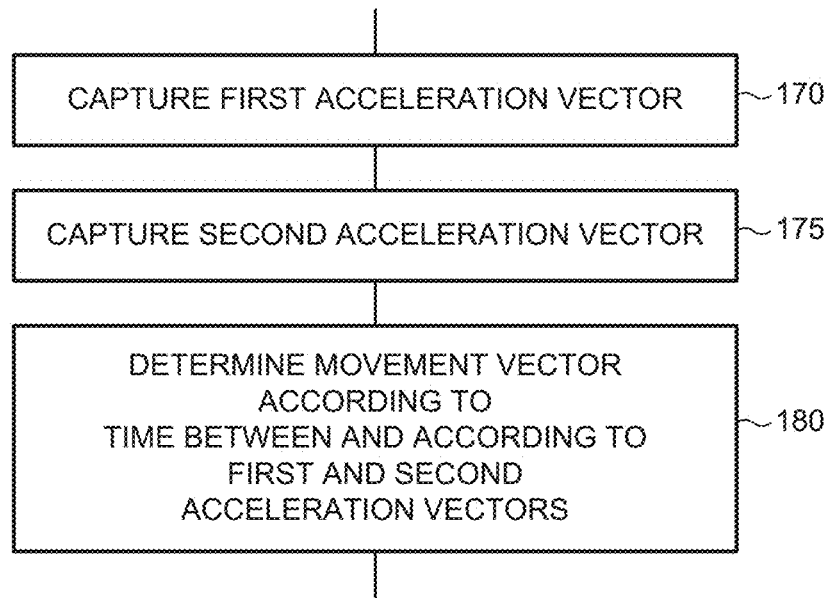
FIG. 3 is a flow diagram that depicts one alternative example method for determining a movement vector based on acceleration of a handheld device.

FIG. 3 is a flow diagram that depicts one alternative example method for determining a movement vector based on acceleration of a handheld device. It should likewise be appreciated that, according to various illustrative use cases, handheld devices include a plethora of sensors, including acceleration sensors. As such, one alternative example method for determining a movement vector includes capturing a first acceleration vector (step 170), capturing a second acceleration vector (step 175) and then determining a movement vector according to the first and second acceleration vectors (step 180). It should likewise be appreciated that determining a movement vector also includes a step for determining the amount of time elapsed between the first and second acceleration vectors (step 180).

The amount of time that elapses between the first and second acceleration vectors is used to calculate a change in velocity and a change in direction of the handheld device relative to an earlier calculation. It should likewise be appreciated that, according to this alternative example method, the initial movement vector of the handheld device is required in order to ascertain a subsequent movement vector according to this alternative example method. As such, this alternative example method is extremely useful in situations where an initial movement vector is ascertained using other methods, for example based on the location of the handheld device, and where other methods cannot be used because the data necessary to calculate a new movement vector is not available.

According to one illustrative use case, an initial movement vector is ascertained according to a first and second geolocation and according to the amount of time elapsed between capturing of the first and second geolocations and where, for example, geolocation information cannot be obtained for lack of a stable incoming signal to be used by a GPS receiver. It should be appreciated that this illustrative use case is intended to help further clarify this alternative example method and is not intended to limit the scope of the claims appended hereto.

Figure 3A:
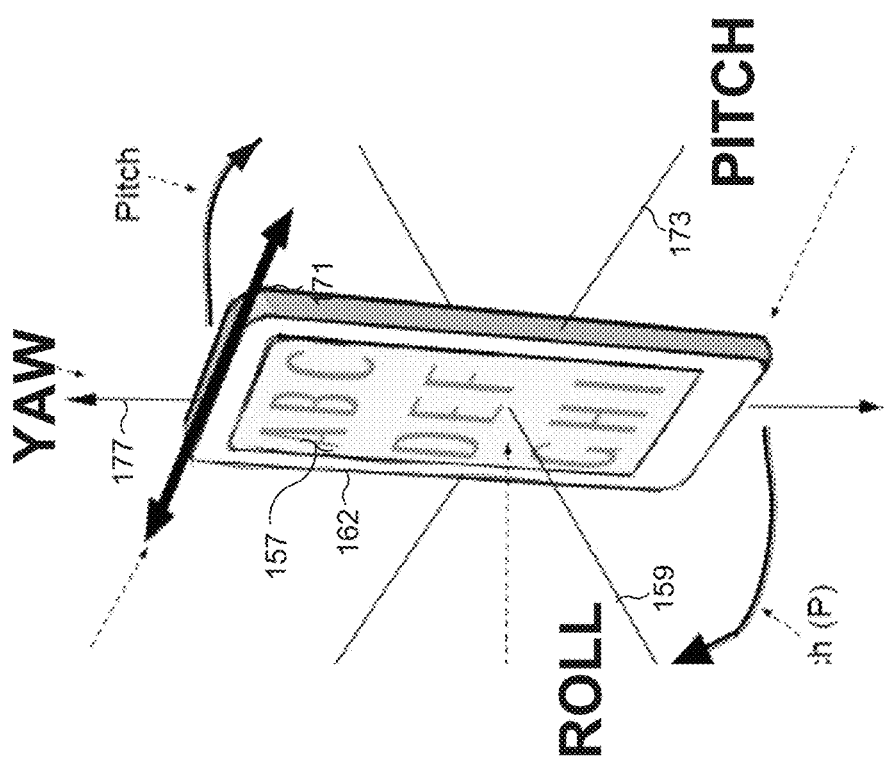
FIG. 3A is a pictorial diagram that illustrates a coordinate system useful in implementing one example method for modifying user interaction with a handheld device.

FIG. 3A is a pictorial diagram that illustrates a coordinate system useful in implementing one example method for modifying user interaction with a handheld device. It should be appreciated that the movement of a handheld device is ascertained according to various alternative methods herein described and which results in a movement vector that comprises a velocity indicator and a directional indicator. It should likewise be appreciated that, according to various illustrative use cases, the directional indicator is relative to a front-facing display screen 157 included in a handheld device 162.

Given that the front-facing display screen 157 serves as a reference for the directional indicator to ascertain when a movement vector is determined, it is helpful to visualize motion of the handheld device 162 using simple aeronautical terms, which are typically associated with an airplane in free space. As such, the front-facing display screen 157 is situated as would be the nose of an aircraft.

A first axis of rotation can be visualized from the center of the front-facing display screen 157 running orthogonally through the handheld device. This first axis of rotation 159 is called the "ROLL" axis. The ROLL axis 159 is typically associated with movement of an aircraft about a longitudinal axis running from its nose to its tail.

A second axis of rotation can be visualized as orthogonal to the ROLL axis 159 when viewed from the top of an aircraft. Accordingly, this is called the PITCH axis 173. The third axis of rotation is orthogonal to both the ROLL axis 159 and the PITCH axis 173. Adopting the aeronautical term for this axis, this axis is called the YAW axis 177. It should likewise be appreciated that the top edge of a handheld device 171 will rotate about the YAW axis 177. It is this angle about the YAW axis relative to the direction of movement of the vehicle that is used as a gating characteristic for clearing a lockout, as herein described. It should be appreciated that the movement of the vehicle is represented by the movement vector. Accordingly, deviation relative to the movement vector of the vehicle is specified as ROLL, PITCH and YAW angles.

Figure 3C:
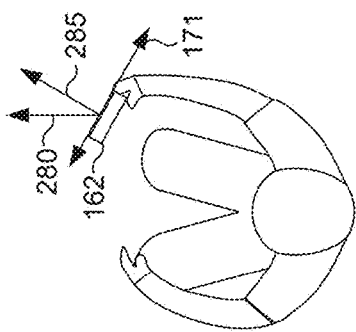
FIGS. 3B through 3E are pictorial diagrams that illustrate various angles of deviation for a display as might be held by a driver or a passenger of a vehicle.
Figure 3E:
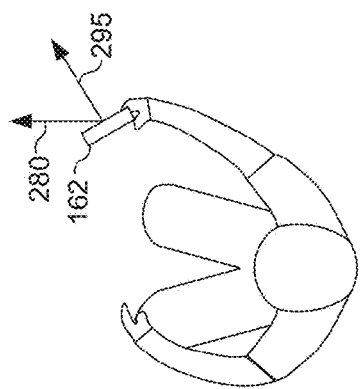
Figure 3B:
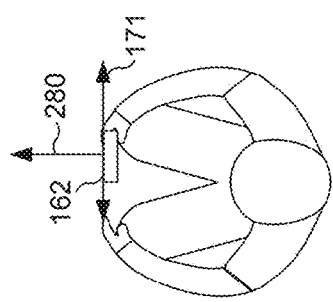

FIGS. 3B through 3E are pictorial diagrams that illustrate various angles of deviation for a display as might be held by a driver or a passenger of a vehicle. Again noting that it is the top edge 171 of the display 157 included in a handheld device 162 that is used to ascertain the deviation angle relative to the direction of movement of the vehicle, FIG. 3B illustrates that, when a user holds a handheld device 162 substantially in front of them, the direction of vehicle movement 280 and the angle of the handheld device are substantially coincident. It should be appreciated that the coincidence is ascertained by an axis normal to the top edge 171 of the display 157.

Figure 3D:
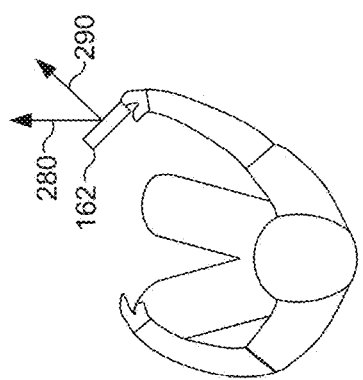

FIG. 3C illustrates that, as a user begins to hold the handheld device 162 off to one side, the angle of the top edge 171 of the display 157, at least an axis normal thereto 285, begins to deviate from the direction of travel 280. As such, greater and greater deviation (290, 295), as illustrated in FIGS. 3D and 3E, results as the user holds the handheld device 162 further to the side. At some point, the deviation 295 relative to the direction of travel 280 becomes so large that a user cannot maintain effective gaze upon the roadway. As such, an inference is drawn that the user holding the handheld device off to the side is actually a passenger, rather than the driver of a vehicle. It should be appreciated that the axis normal to the top edge 171 of the display 157 is substantially the direction in which a user needs to focus attention in order to read information on the display 157. Although the illustrations provided here show that a user is holding a handheld device to the right of their person, the handheld device can just as easily be held to the left of a user's person.

Figure 4:
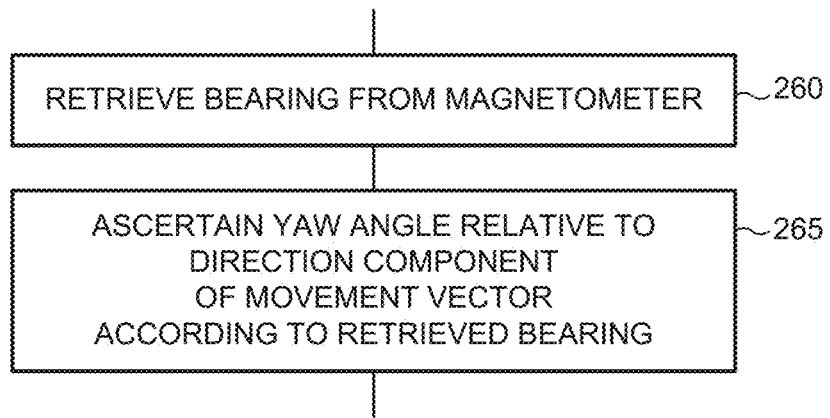
FIGS. 4 and 5 are flow diagrams that depict alternative example methods for determining a deviation angle of an upper edge of a display included in a handheld device relative to a movement vector.
Figure 5:
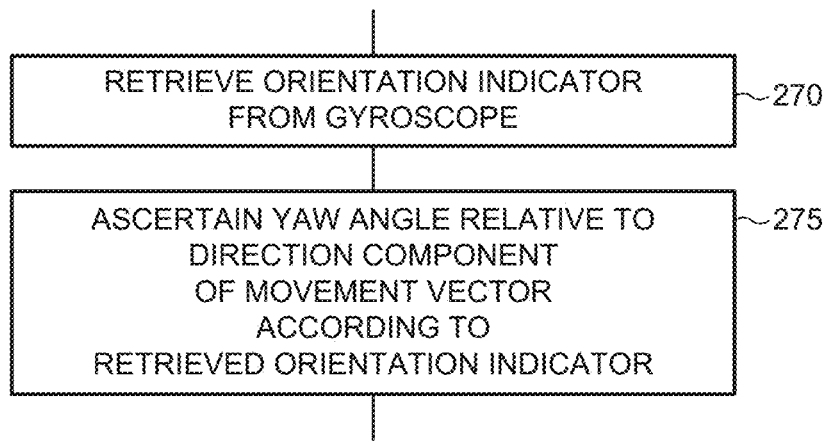

FIGS. 4 and 5 are flow diagrams that depict alternative example methods for determining a deviation angle of an upper edge of a display included in a handheld device relative to a movement vector. As heretofore described, the upper edge 171 of a display included in a handheld device is said to rotate about the YAW axis 177. According to one alternative example method, the deviation angle of an upper edge of a display 157 included in a handheld device 162 relative to the movement vector 280 is ascertained by retrieving a bearing from a magnetometer (step 260), said magnetometer being included in the handheld device 162. According to this alternative example method, the angle of rotation of the handheld device 162 about the YAW axis 177 is merely the bearing retrieved from the magnetometer. The deviation angle is then ascertained by simply taking a difference between the direction 280 indicated by the movement vector and the bearing retrieved from the magnetometer, said bearing indicating the orientation of the handheld device within the Earth's magnetic field.

According to yet another alternative example method, an orientation indicator is received from a gyroscope (step 270), wherein the gyroscope is included in the handheld device 162. It should be appreciated that, commensurate with standard operations of such a device, a gyroscope provides indications regarding changes in orientation. In a typical handheld device, the orientation of the handheld device 162 is set by other means, for example a bearing as retrieved from a magnetometer. Then, indications from the gyroscope included in the handheld device 162 are then used to update a current orientation. According to this alternative example method, the initial orientation of the handheld device 162 is established using a bearing retrieved from the magnetometer included in the device. Using angular acceleration data from the gyroscope, rotation about the YAW axis 177 is determined as an offset from an initial orientation. Accordingly, the YAW axis 177 orientation of the handheld device 162 is used in conjunction with a direction component of the movement vector in order to ascertain a deviation angle.

Figure 6:
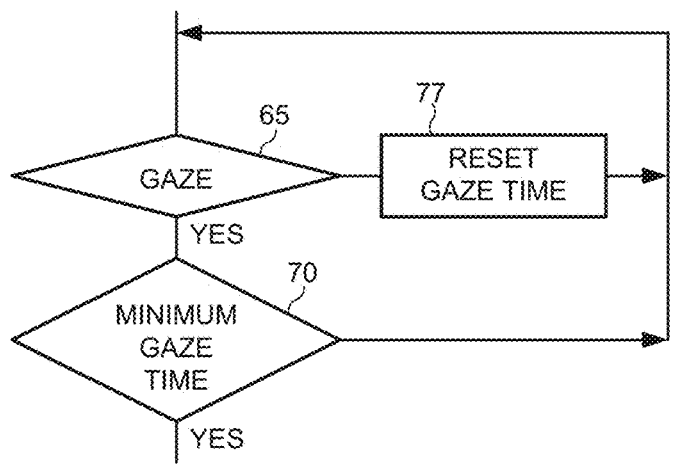
FIG. 6 is a flow diagram that depicts one example alternative method for determining a gaze characteristic based on the length of fixation.

FIG. 6 is a flow diagram that depicts one example alternative method for determining a gaze characteristic based on the length of fixation. According to this alternative example method, determining a gaze characteristic comprises determining when the user gazes upon a display screen included in a handheld device 162 for a minimum amount of time. Accordingly, it is first determined when a gaze event occurs (step 65). When a gaze event is detected, a gaze time is incremented and compared against a minimum gaze time requirement (step 70). If the minimum gaze time has not been satisfied, the gaze event condition is again checked (step 65). If the gaze event is not detected before the minimum gaze time has elapsed, then the gaze time is reset (step 77). In this manner, this alternative method provides that a continuous gaze occurs for a minimum amount of time.

Figure 7:
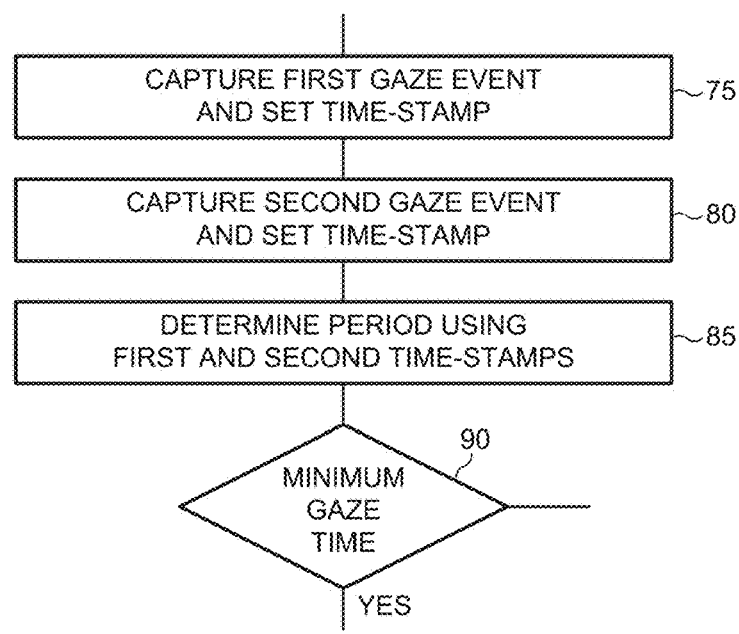
FIG. 7 is a flow diagram that depicts one alternative example method for determining gaze time.

FIG. 7 is a flow diagram that depicts one alternative example method for determining gaze time. It should be appreciated that, according to this alternative example method, a time-stamp is obtained when a first gaze event occurs (step 75). This first included step is followed by an additional step wherein a time-stamp is obtained when a second gaze event is occurs (step 80). The amount of gaze time, according to this example alternative method, is then determined by an additional step wherein the period of gaze is determined according to the first and second time-stamps (step 85). Accordingly, an additional step included in this alternative method provides for determining whether or not the minimum gaze time is satisfied (step 90).

FIG. 1A shows that once the deviation exceeds a particular minimum threshold (step 35), a gaze characteristic is determined (step 40). Because of the inference that may be drawn once the deviation angle is greater than the minimum threshold, the gaze characteristic is used to ensure that a user is directing attention to the handheld device 162. Again, by inference, the driver of a vehicle should not typically pay attention to the handheld device 162, especially when the handheld device is held at an angle greater than a minimum deviation angle.

Figure 8:
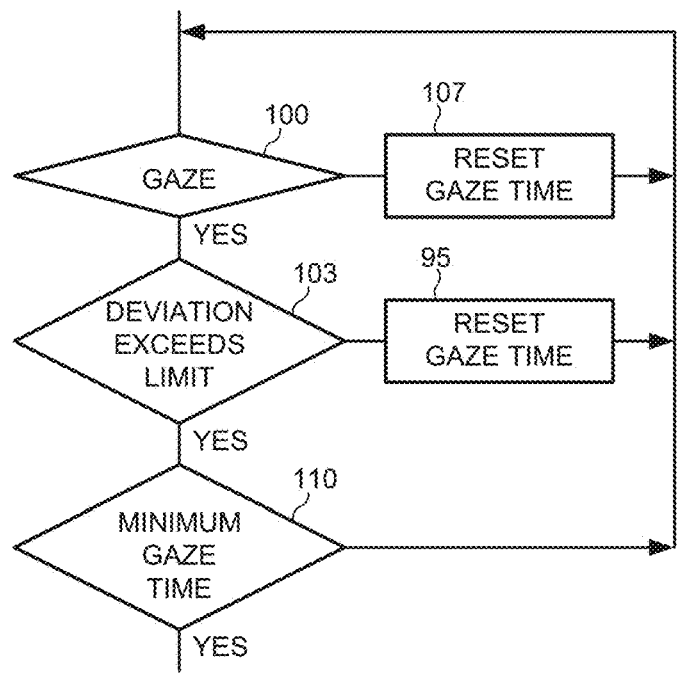
FIG. 8 is a flow diagram that depicts one alternative method wherein the angle at which the handheld device is positioned relative to the direction of travel is also checked substantially contemporaneously with checking if a user is looking at the handheld device.

FIG. 8 is a flow diagram that depicts one alternative method wherein the angle at which the handheld device is positioned relative to the direction of travel is also checked substantially contemporaneously with checking if a user is looking at the handheld device. It should be appreciated that, in order to maximize the effectiveness of application of the present method, it is important to determine the angle of the handheld device relative to the direction of travel. For example, if the user is holding the handheld device directly in front of their person, see FIG. 3B, the angle of the handheld device is most likely substantially orthogonal relative to the direction of travel. As such, it may be inferred that the user does not want to deviate attention from the roadway. Following said inference, it is likely that a user holding a device directly in front of their person is actually piloting the vehicle.

According to this alternative example method, determination of a gaze characteristic includes a step to identify that a gaze event is taking place (step 100), and ensuring that the deviation angle exceeds a particular minimum threshold angle (step 103). Once the gaze event occurs for a minimum gaze time (step 110), then a gaze characteristic is satisfied and a lockout is cleared accordingly. As depicted in the flow diagram, in the event that, during serial checks of gaze events (step 100), the gaze time is reset (step 95) in the event that the deviation does not exceed the minimum threshold value (step 103). Also, in the event a gaze is not detected, the gaze time is also reset (step 107). In this manner, this alternative example method provides that a user maintains gaze and also maintains the minimum deviation angle for a minimum amount of gaze time (step 110).

Figure 9:
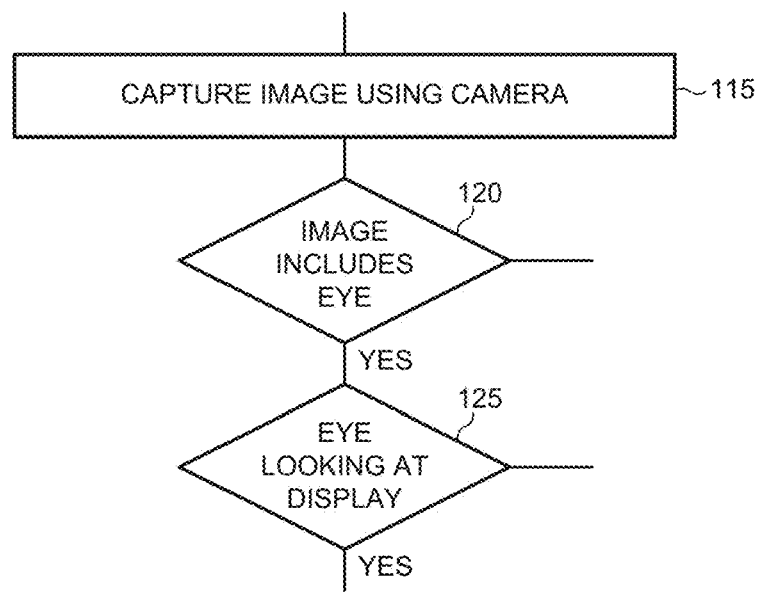
FIG. 9 is a flow diagram that depicts one alternative method for recognizing a gaze event using a camera element.

FIG. 9 is a flow diagram that depicts one alternative method for recognizing a gaze event using a camera element. According to this alternative example method, a gaze event is recognized using an image captured by a camera element (step 115) included in a handheld device 162. In the event that the image captured by the camera element includes an image of an eye (step 120) and the eye is oriented toward a display included in the handheld device (step 125), a gaze event is recognized. It should likewise be appreciated that, according to one illustrative use case, the present method is implemented by a software element, stored in a memory included in the handheld device, that when executed by a processor in the handheld device, minimally causes that processor to perform such image recognition commensurate with this stated method.

Figure 10:
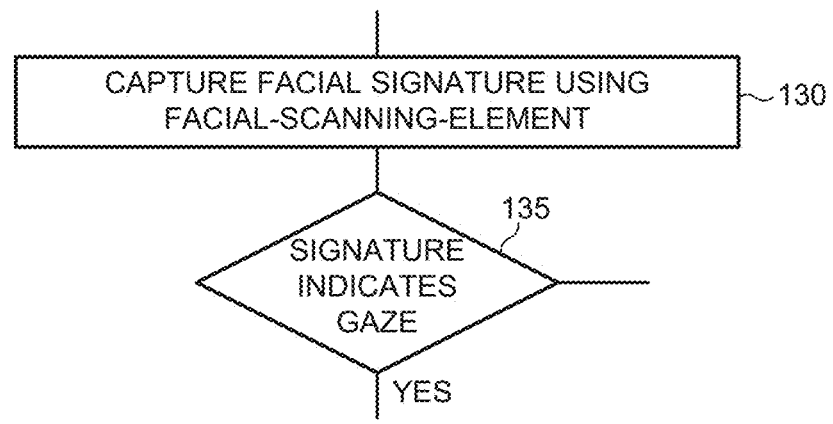
FIG. 10 is a flow diagram that depicts one alternative example method wherein a gaze event is recognized through the use of a facial-scanning-element.

FIG. 10 is a flow diagram that depicts one alternative example method wherein a gaze event is recognized through the use of a facial-scanning-element. Modernly, handheld devices include facial-scanning-elements. According to one illustrative use case, the present method is utilized in conjunction with such a facial-scanning-element in order to capture a facial signature (step 130). One example of such a facial-scanning-element includes a three dimensional scanner, which projects a large number of dots onto a face and then creates a three-dimensional facial signature. Other software included in a handheld device and stored in a memory thereof causes a processor in the handheld device to provide various indications based upon a facial signature. One such indication is a gaze event. Accordingly, if the facial signature captured by the facial-scanning-element indicates such a gaze event, then a gaze event is recognized (step 135).

In some more sophisticated implementations of a handheld device, a three-dimensional facial signature also determines if a user's eyes are open and whether or not the user's eyes are fixated on the screen of the handheld device. Accordingly, all such indications, according to alternative illustrative use cases, are contemplated as other useful variations and applications of the present method.

Figure 11:
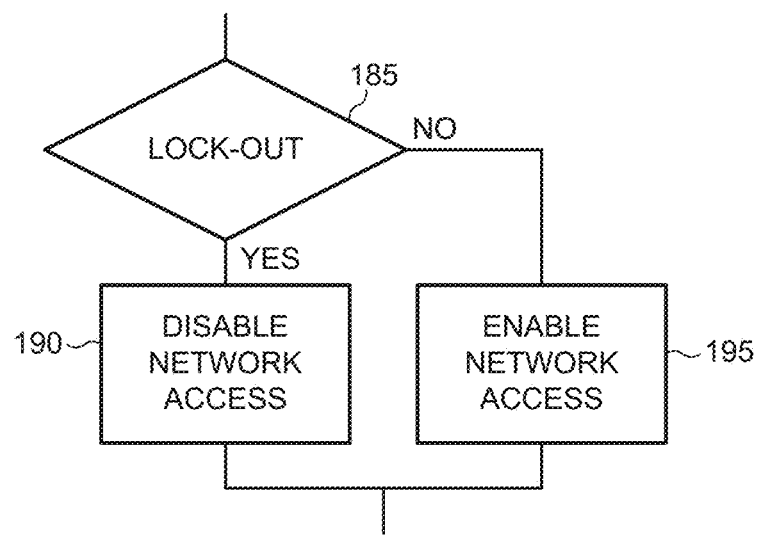
FIGS. 11 through 16 are flow diagrams that depict alternative example methods for modifying user interaction.

FIGS. 11 through 16 are flow diagrams that depict alternative example methods for modifying user interaction. It should be appreciated that, so long as a lockout condition exists, the operation of a handheld device needs to be modified for the sake of safety. It should likewise be appreciated that, according to various illustrative use cases, various alternative methods are useful for modifying the operation of a handheld device. FIG. 11 depicts one example alternative method wherein network access is disabled (step 190) when a lockout condition exists (step 185). When the lockout condition is cleared (step 185), access to the network is re-enabled (step 195). According to various illustrative use cases, access to a network significantly abridges a user's ability to interact with a handheld device. For example, without network access, a user is not able to access the Internet. Accordingly, a driver of a vehicle is prevented from accessing webpages or checking email.

Figure 12:
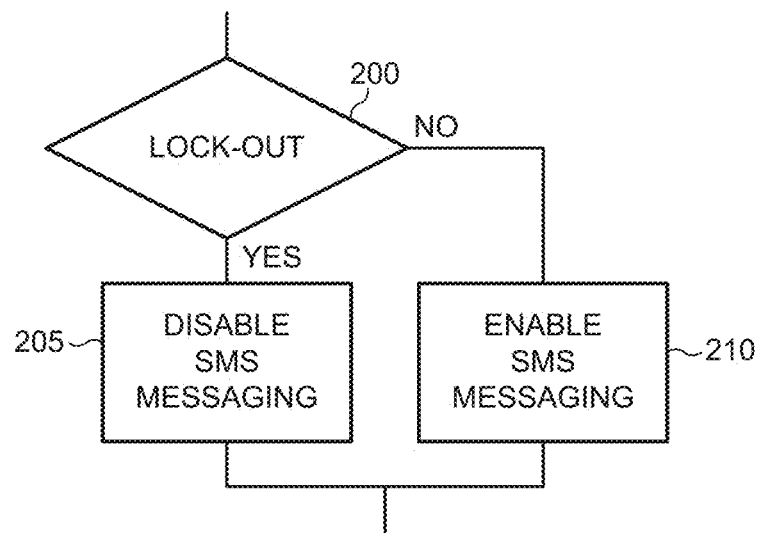

FIG. 12 depicts yet another alternative example method wherein short-message-service messaging is disabled (step 205) when a lockout condition persists (step 200). Short-message-service messaging is re-enabled (step 210) when the lockout condition is cleared (step 200). It should likewise be apparent that a significant safety hazard exists when a user is operating a vehicle and attempting to send or receive text messages. In one illustrative use case, disabling short-message-service comprises disabling a short-message-service application, which is executed by a user of a handheld device 162 in order to send and receive text messages.

Figure 13:
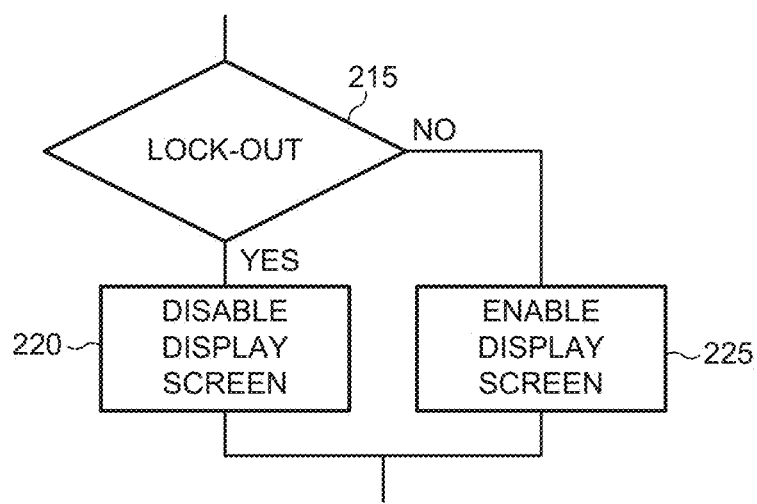

FIG. 13 depicts yet another alternative example method wherein a display 157 included in a handheld device 162 is disabled (step 220) when a lockout condition exists (step 215). The display 157 is re-enabled (step 225) when the lockout condition is cleared (step 215). It should likewise be appreciated that, according to various illustrative use cases, the lockout condition 215 interacts with a software display driver included in the handheld device 162, and which is stored in a memory thereof. A processor in the handheld device 162, when executing the display driver, will disable the display based upon the lockout condition, which according to one illustrative use case comprises a Boolean-flag or semaphore.

Figure 14:
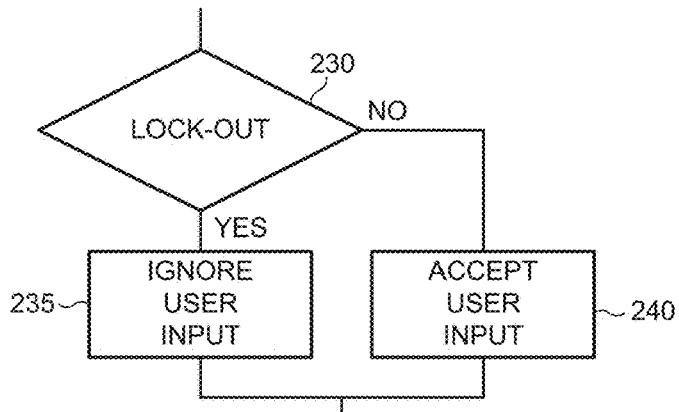

FIG. 14 depicts yet another alternative example method that comprises a step for ignoring a user input (step 235) when a lockout condition is in effect (step 230). Accordingly, when the lockout condition is cleared (step 230), the user input is again accepted (step 240). It should be appreciated that, according to one illustrative use case, an application receives user input by way of an operating system call back. In such illustrative use case, it is the operating system that disables the callback function when the lockout condition is in effect.

Figure 15:
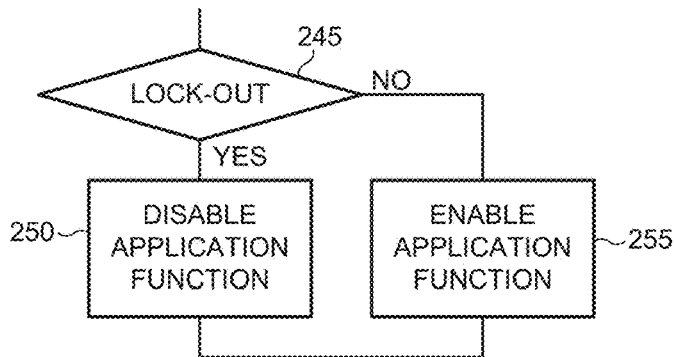

FIG. 15 illustrates one alternative example method wherein a particular function in an application is disabled (step 250) when a lockout condition exists (step 245). And, this alternative method includes a step for re-enabling that particular application function (step 255) when the lockout condition is cleared (step 245).

Figure 16:
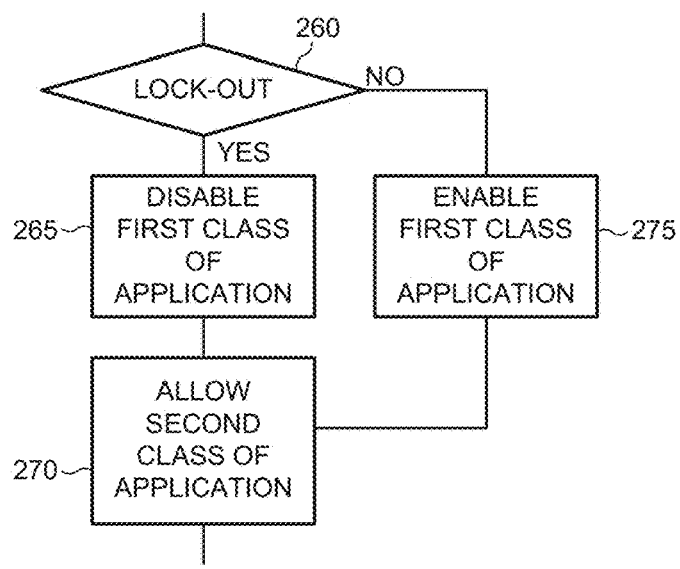

FIG. 16 depicts yet another alternative example method wherein a first class of applications is disabled (step 265) when a lockout condition exists (step 260). A second class of applications is allowed to continue operation (step 270) when the lockout condition exists (step 260). When the lockout condition is cleared (step 260) the first class of applications is re-enabled (step 275).

This particular variation of the present method is useful in situations where certain applications, for example a text messaging application, is disabled but certain other applications are allowed to continue to execute, for example a navigational application. These illustrative use cases are intended to further clarify this alternative example method and are not intended to limit the scope of the claims appended hereto.

Figure 17:
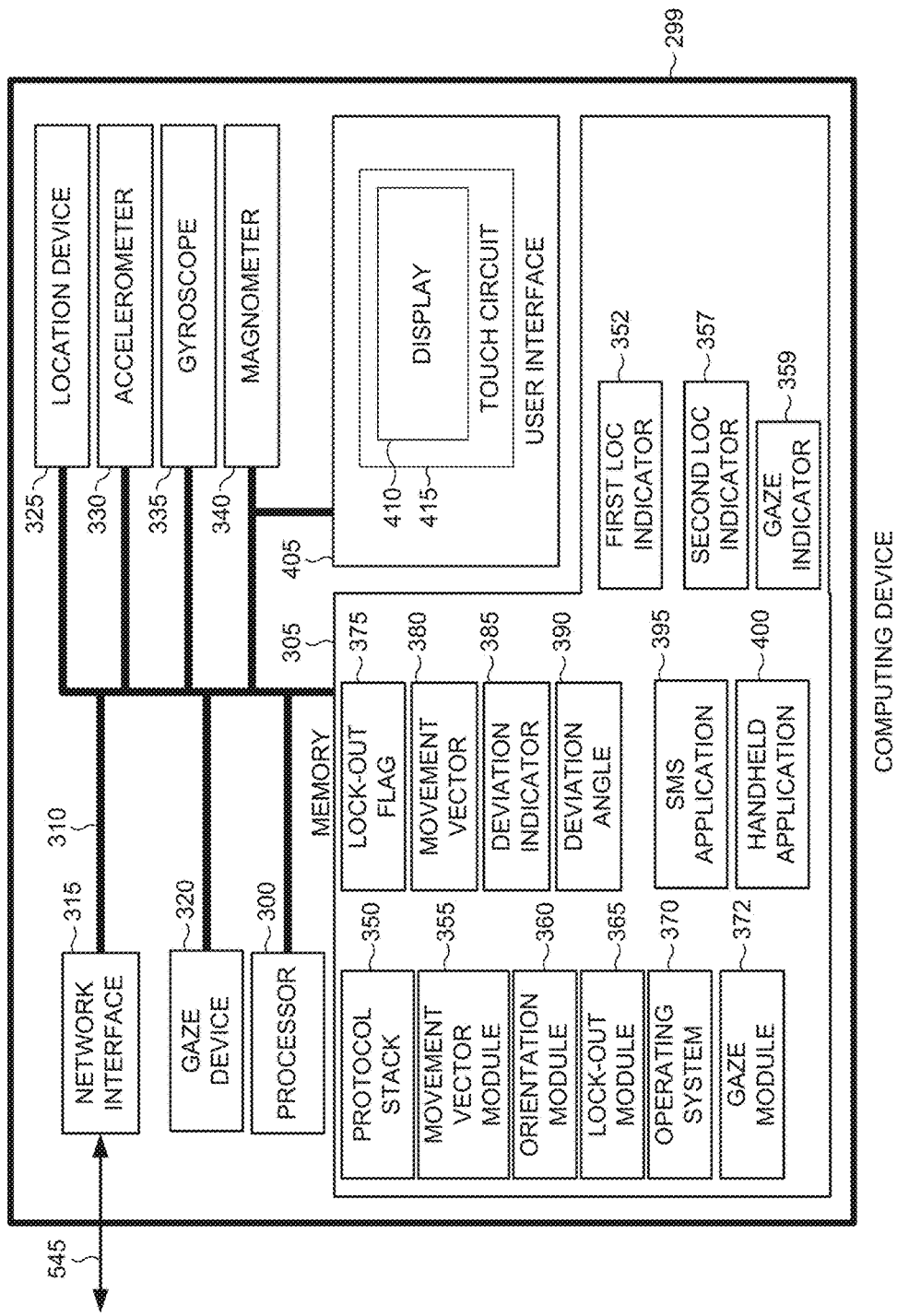
FIG. 17 is a block diagram that depicts one example embodiment of the computing device that modifies interaction with a user based on its movement.

FIG. 17 is a block diagram that depicts one example embodiment of the computing device that modifies interaction with a user based on its movement. According to this example embodiment, a computing device 299 comprises a user interface 405, a location device 325, a gaze monitoring device 320, an orientation device, a processor 300, a memory 305, and various instruction sequences stored in the memory 305.

The reader is advised that the term "minimally causes the processor" and variants thereof is intended to serve as an open-ended enumeration of functions performed by the processor 300 as it executes a particular functional process (i.e. instruction sequence). As such, an embodiment where a particular functional process causes the processor to perform functions in addition to those defined in the appended claims is to be included in the scope of the claims appended hereto.

FIG. 17 further illustrates that, according to this example embodiment, the computing device 299, includes a movement vector module 355, and an orientation module 360, both of which are stored in the memory 305. Also included in this example embodiment is a gaze module 372 and a lockout module 365, each of which is stored in the memory 305.

Figure 18:
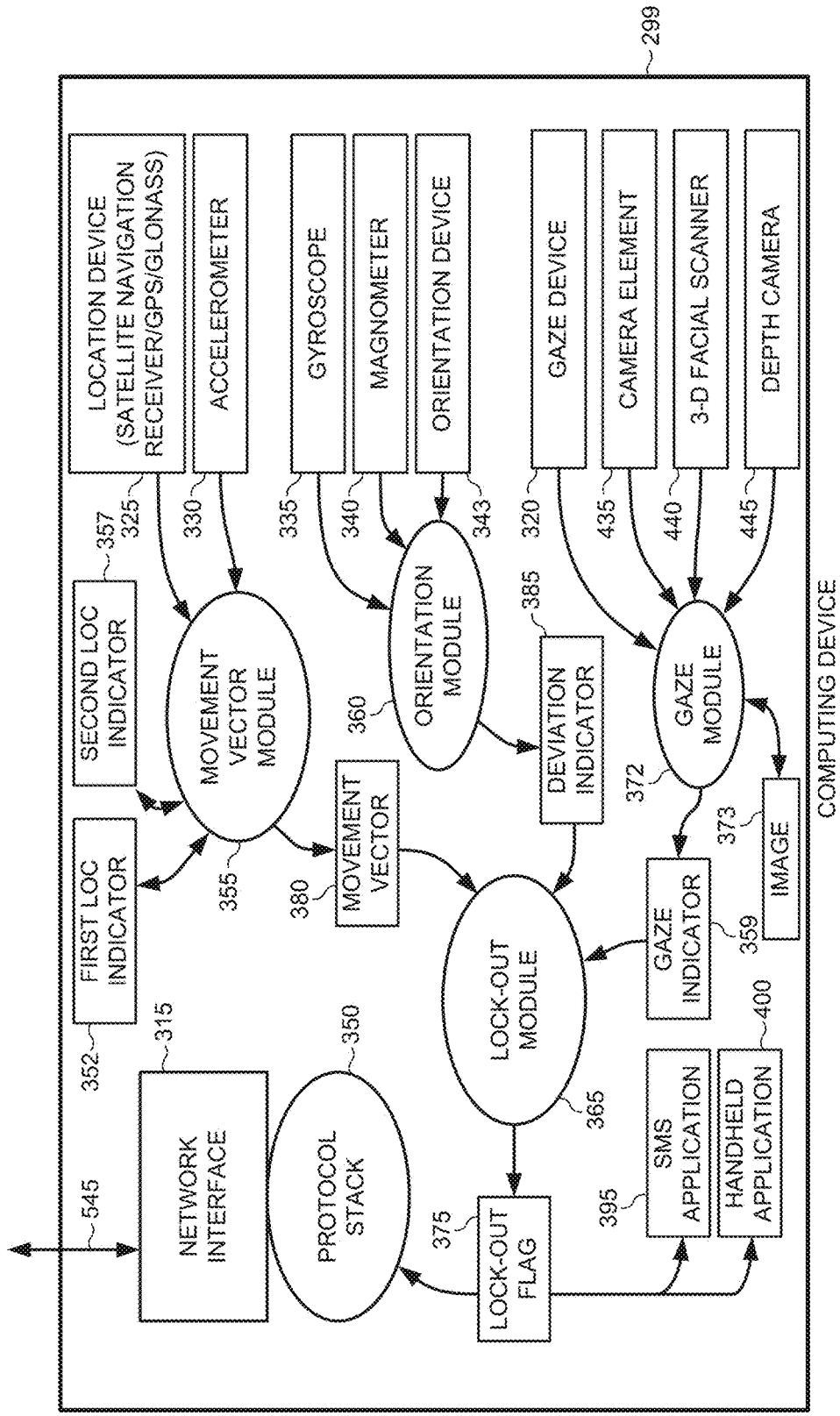

FIGS. 18 and 19 collectively constitute a data flow diagram that illustrates how this example embodiment of a computing device affects modification of user interaction according to its own movement. According to this example embodiment, the movement vector module 355, when executed by the processor, minimally causes the processor to retrieve from the location device 325 a first location indicator 352 and to store this first location indicator in the memory 305. As the processor 300 continues to execute the movement vector module 355 of this example embodiment, it then retrieves a second location indicator 357 from the location device 325 and also stores this in the memory 305. Based on the first location indicator 352 and the second location indicator 357, each of which is stored in the memory 305, the processor 300, as it continues to execute this example embodiment of the movement vector module 355, determines a movement vector and then stores the movement vector 380 in the memory 305.

It should be appreciated that, according to various alternative example embodiments of the computing device, the location device 325 comprises a satellite-navigation-receiver. According to yet another example alternative embodiment, the location device 325 comprises a global positioning satellite (GPS) receiver. According to yet another alternative embodiment, the GPS receiver comprises a WAAS enabled receiver. And in yet another alternative example embodiment, the location device 325 comprises a GLONASS receiver.

FIG. 18 also illustrates that, according to one alternative example embodiment, the movement vector module 355, when executed by the processor 300, minimally causes the processor 300 to receive movement change information from the accelerometer 330. In this alternative embodiment, when location information is not available from the location device 325, then the processor 300, as it executes this alternative embodiment of the movement vector module 355, uses the change information in order to adjust the movement vector 380. Hence, according to this alternative embodiment, should satellite location information be unavailable, accelerometer information from the accelerometer 330 is used to update the movement vector 380 until the satellite location information can be restored. It should likewise be appreciated that such loss of satellite location information is typically encountered when there is obstruction and the satellite receiver cannot receive signals from a satellite.

The orientation module 360, when executed by the processor, minimally causes the processor 300 to retrieve an orientation indicator from the orientation device 343 and to store the orientation indicator in the memory 305. It should be appreciated that, according to one alternative example embodiment, the orientation device comprises a magnetometer. The orientation indicator provides an indication of the orientation of the handheld computing device relative to the vehicle's movement vector. This indication is, according to this example embodiment, expressed by angles of deviation of YAW, PITCH, and ROLL axis relative to the movement vector.

According to yet another alternative example embodiment, the computing device further comprises a gyroscope 335. The gyroscope 335 is also communicatively coupled to the processor 300 by way of the internal bus 310. According to some illustrative use cases, anomalous information is obtained from the magnetometer. As such, according to one alternative example embodiment, the processor 300, as it continues to execute the orientation module 360, receives change information pertaining to change in angle deviation relative the YAW, PITCH, and ROLL axis. Using this change in angle information, the processor 300, as it continues to execute the orientation module 360, updates the deviation indicator 385. This provides for greater accuracy when the magnetometer is subject to magnetic interference.

FIG. 18 further illustrates that, according to one alternative example embodiment, the gaze-monitoring-device comprises a camera element 435. According to this alternative example embodiment, the gaze module 372, when executed by the processor 300, minimally causes the processor 300 to retrieve a first image from the camera element 435. Upon receiving the first image, the gaze module 372 further minimally causes the processor 300 to detect whether or not the image includes a representation of a user's eye. According to yet another alternative example embodiment, the gaze module 372 further minimally causes the processor 300 and to determine whether an eye is oriented toward the display 410 included in the computing device 299.

As the processor continues to execute this example embodiment of a gaze module 372, it sets a gaze indicator 359 when it receives an image that includes a representation of a user's eye and the representation of the user's eye is oriented toward the display 410 included in the computing device 299. According to this alternative example embodiment, the gaze module 372, as it is further executed by the processor 300, further minimally causes the processor 300 to retrieve one or more additional images from the camera element 435. In fact, the processor 300 will continue to retrieve images from the camera element 435 in order to determine whether or not a retrieved image includes a representation of the user's eye and to further determine whether or not the representation of the user's eye is oriented toward the display 410. The processor 300, as it continues to execute this example embodiment of the gaze module 372, will clear the gaze indicator 359 when a received image no longer represents an eye that is oriented toward the display.

It should likewise be appreciated that, according to one alternative example embodiment, the gaze module 372 minimally causes the processor 300 to interact with the camera element 435 in order to retrieve successive images therefrom. However, according to this alternative example embodiment of a gaze module 372, the gaze module 372 minimally causes the processor to, in addition to detecting a user's eye, also determines whether or not a user's face is oriented toward the display 410. It should be appreciated that, according to various illustrative use cases, a user may attempt to evade the safeguards provided by the computing device herein described by maintaining a particular posture of their face, for example such as continuing to look forward toward the direction of travel of a vehicle, but yet try to direct their visual attention toward the display 410. According to this alternative embodiment, unless the face is also oriented toward the display 410, the gaze characteristic is not satisfied. As such, this alternative example embodiment of a gaze module 372, when executed by the processor 300, minimally causes the processor 300 to set the gaze indicator 359 when an eye is looking at the display 410 and the face is also oriented toward the display.

FIG. 18 also illustrates that, according to one alternative example embodiment of a computing device 299, the gaze device comprises a 3-D facial scanner 440. In yet another alternative example embodiment, the gaze device comprises a depth camera 445. It should be appreciated that such devices are referred to herein as hardware facial recognition devices.

In either of these two alternative example embodiments of a computing device 299, the gaze module 372 receives a facial signature from at least one or more of a 3-D facial scanner 440 and/or a depth camera 445. It should be appreciated that a facial signature received from such hardware facial recognition devices includes information as to the direction the face is oriented, relative to the display 410. These and other hardware facial recognition devices also provide information as to whether or not an eye is open and the direction the eye is oriented relative to the display 410. Accordingly, it is the hardware device that creates a facial signature based upon perceived facial orientation and the perceived state of a user's eye and the direction that the user's eye is oriented.

FIG. 18 also illustrates that, according to one alternative example embodiment, the lockout module 365, as executed by the processor 300, further causes the processor 300 to determine the length of time a user focuses attention upon the display 410 included in the computing device 299. According to this alternative embodiment, the processor 300, as it continues to execute the lockout module 365, will set a first-time tag when the gaze indicator 359 becomes active. Then, the processor 300 sets a second time tag when the gaze indicator 359 becomes inactive. Accordingly, the processor 300, as it executes this example embodiment of the lockout module 365, will determine the length of time that a user is focused upon the display based upon the two time tags.

Once the processor 300 determines that the user has diverted attention to the computing device 299 for a minimum amount of time, which, according to this alternative embodiment, is determined by a pre-established length of time condition, the processor 300 will clear the lockout flag 375. In one alternative example embodiment, the processor 300 will only clear the lockout flag when the deviation indicator 385 exceeds a pre-established threshold and the deviation angle was maintained during the entire pre-establish length of time for the gaze condition.

FIGS. 17 and 18 also illustrate that, according to one alternative example embodiment of a computing device, the computing device 299 further includes a network interface 315. The network interface 315 includes an attachment 545 that is used to connect to a network. It should be appreciated that the network interface 315, according to various alternative example embodiments, comprises at least one or more of a wireless Bluetooth interface, a wireless modem, a satellite data link transceiver, a cellular data carriage, and/or a Wi-Fi interface. This alternative example embodiment further includes a protocol stack 350, which is stored in the memory 305.

One aspect of today's innovation is that modifying interaction with a user comprises modifying network connectivity when a locked-out flag has been set by the processor 300 as it executes the lockout module 365. Accordingly, this alternative example embodiment of a computing device 299 includes a protocol stack 350, which, when executed by the processor 300, causes the processor to establish a communications connection by way of the network interface 315 only when the lockout flag 375 is not set.

According to yet another alternative example embodiment of a computing device 299, the computing device 299 further includes a short message service application 395. The short message service application 395 of this alternative embodiment, when executed by the processor 300, minimally causes the processor 300 to only send a short message service message when the lockout flag 375 is not set.

FIG. 19 shows that, according to yet another alternative example embodiment, the computing device 299 includes a user interface driver 407 that is also stored in the memory 305. When executed by the processor 300, the user interface driver 407 of this alternative embodiment minimally causes the processor to prevent usage of a user interface when the lockout flag is set.

FIG. 18 also shows that, according to yet another alternative example embodiment of a computing device 299, the computing device 299 includes a handheld application 400, which is stored in the memory 305. When the processor 300 executes this handheld application 400, the processor 300 suspends execution of the user application when the lockout flag 375 is set.

The functional processes (and their corresponding instruction sequences) described herein enable modification of user interaction in accordance with the techniques, processes and other teachings of the present method. According to one alternative embodiment, these functional processes are imparted onto computer readable medium. Examples of such medium include, but are not limited to, random access memory, read-only memory (ROM), Compact Disk (CD ROM), Digital Versatile Disks (DVD), floppy disks, flash memory, and magnetic tape. This computer readable medium, which alone or in combination can constitute a stand-alone product, can be used to convert a general or special purpose computing platform into an apparatus capable of modifying user interaction according to the techniques, processes, methods and teachings presented herein. Accordingly, the claims appended hereto are to include such computer readable medium imparted with such instruction sequences that enable execution of the present method and all of the teachings afore described.

Some aspects of the innovation described rely on one or more hardware elements in a computing-device. In such cases, the various functional modules that are executed by the processor cause the processor to retrieve information from, direct information to, retrieve status information from and direct control information to such one or more hardware elements. Accordingly, the claims, when referring to interaction between a processor and a hardware device, are to be read as broadly as possible such that storing or retrieving information, according to some embodiments, is stored in and/or retrieved from intermediary storage elements including a memory and that such memory is also to include a register in the processor itself. Likewise, such broad interpretation is to be given to claims where the processor, as it executes a functional module, creates information. Such information, according to alternative embodiments is stored in and/or retrieved from intermediary storage elements including a memory and that such memory is also to include a register in the processor itself.

Aspects of the method and apparatus described herein, such as logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as electrically erasable programmable read-only memory i.e "EEPROM"), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types.

While the present method and software element has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for modifying interaction of a user with a hand-held device comprising:
   determining a movement vector according to movement of the hand-held device;
   establishing a lock-out condition when a speed component of the movement vector exceeds a pre-established threshold;
   determining a deviation angle of an upper edge of a display included in the hand-held device relative to a direction component of the movement vector;
   recognizing a gaze event when the deviation angle exceeds a pre-established threshold;
   clearing the lock-out condition when the gaze-event conforms to a pre-established condition; and
   modifying user interaction during the lock-out condition.

2. The method of claim 1 wherein determining a movement vector comprises:
   ascertaining a first geolocation of the hand-held device;
   ascertaining a second geo-location of the hand-held device; and
   determining a movement vector according to the first geolocation, the second geolocation and the amount of time elapsed between the first and second geolocations.

3. The method of claim 1 wherein determining a movement vector comprises:
   ascertaining a first acceleration vector of the hand-held device;
   ascertaining a second acceleration vector of the hand-held device; and
   determining a movment vector according to the first acceleration vector, the second acceleration vector and the amount of time elapsed between ascertaining the first acceleration vector and ascertaining the second acceleration vector.

4. The method of claim 1 wherein determining a deviation angle of an upper edge of a display comprises retrieving a bearing from a magnetometer included in the handheld device; and ascertaining the angle about the yaw axis of the handheld device relative to a direction component included in the movement vector according to the retrieved bearing.

5. The method of claim 1 wherein determining a deviation angle of an upper edge of a display comprises retrieving an orientation indicator from a gyroscope included in the handheld device; and ascertaining the angle about the yaw axis of the handheld device relative to a direction component included in the movement vector according to the retrieved orientation indicator.

6. The method of claim 1 wherein determining when a gaze event conforms to a pre-established condition comprises determining when a gaze-event occurs for a pre-established minimum gaze-time.

7. The method of claim 1 wherein determining when a gaze event conforms to a pre-established condition comprises:
   determining a time-stamp for a first gaze-event;
   determining a time-stamp for a second gaze event; and
   calculating a period according to the first and second gaze event time-stamps and wherein a conforming condition comprises a pre-established minimum period between gaze events.

8. The method of claim 1 wherein determining when a gaze event conforms to a pre-established condition comprises determining when a gaze event occurs for a minimum amount of time substantially concurrent with a minimum deviation angle.

9. The method of claim 1 wherein recognizing a gaze event comprises:
   capturing an image using a camera-element included in a hand-held device; and
   recognizing a gaze-event when the image includes an eye and the eye is oriented toward a display included in the hand-held device.

10. The method of claim 1 wherein recognizing a gaze event comprises:
    capturing a facial signature using a facial-capture-element included in a hand-held device; and
    recognizing a gaze-event when the facial signature indicates a user is looking at a display included in the hand-held device.

11. The method of claim 1 wherein modifying user interaction comprises:
    enabling network access by the hand-held device according to the lock-out condition.

12. The method of claim 1 wherein modifying user interaction comprises:
    enabling a presentation of a short-message-service message according to the lock-out condition.

13. The method of claim 1 wherein modifying user interaction comprises:
    disabling the display screen when the lock-out condition is in effect; and
    enabling the display screen when the lock-out condition is cleared.

14. The method of claim 1 wherein modifying user interaction comprises:
    ignoring user input when the lock-out condition is in effect; and
    accepting user input when the lock-out condition is cleared.

15. The method of claim 1 wherein modifying user interaction comprises:
    disabling an application function when the lock-out condition is in effect; and
    enabling an application function in the hand-held device when the lock-out condition is cleared.

16. The method of claim 1 wherein modifying user interaction comprises:
    disabling a first class of applications when the lock-out condition is in effect;
    allowing a second class of applications to remain enabled when the lock-out condition is in effect; and enabling the first class of applications in the hand-held device when the lock-out condition is cleared.

17. A computing-device comprising:
user interface capable of presenting information to and receiving input from a user;
gaze-monitoring-device capable of ascertaining a gaze-characteristic;
location device capable of ascertaining the location of the computing device;
orientation device capable of ascertaining the orientation of the computing device;
processor for executing one or more instruction sequences;
memory for storing information and one or more instruction sequences and wherein the user interface, the gaze-monitoring-device, the location device, the orientation device, the processor and the memory are communicatively coupled to each other;
one or more instruction sequences stored in the memory including:
movement vector module that, when executed by the processor, minimally causes the processor to:
retrieve from the location device and store in the memory a first location indicator;
retrieve from the location device and store in the memory a second location indicator; and
determine a movement vector according to the first and second location indicators and store the movement vector in the memory; and
orientation module that, when executed by the processor, minimally causes the processor to:
retrieve from the orientation device and store in the memory an orientation indicator; and
retrieve the movement vector from the memory;
determine a deviation angle of an upper edge of a display included in the user interface relative to a direction component of the movement vector; and
store the deviation angle in the memory;
gaze module that, when executed by the processor, minimally causes the processor to:
retrieve from the gaze-monitoring-device a gaze indicator; and
store the gaze indicator in the memory;
lock-out module that, when executed by the processor, minimally causes the processor to:
retrieve the movement vector from the memory;
set a lock-out flag in the memory when a velocity component of the movement vector exceeds a pre-established value;
execute the gaze module when the deviation angle exceeds a pre-established threshold; and
clear the lock-out flag when the gaze-characteristic stored in the memory conforms to a pre-established condition and wherein the computing-device modifies user interaction when the lock-out flag is set.

18. The computing-device of claim 17 wherein location device comprises a satellite-navigation-receiver.

19. The computing-device of claim 18 further comprising an accelerometer communicatively coupled to the processor and wherein the movement vector module, when executed by the processor, further minimally causes the processor to:
receive movement change data from the accelerometer; and
update the movement vector according to the movement change data when the satellite-navigation-receiver is not capable of receiving navigation signals.

20. The computing-device of claim 18 where the satellite-navigation-receiver comprises at least one of a global positioning system (GPS) receiver, a wide area augmentation GPS system receiver (GPS/WAAS), and/or a global navigation satellite system (GLONASS).

21. The computing-device of claim 17 wherein orientation device comprises a magnetometer.

22. The computing-device of claim 21 further comprising a gyroscope communicatively coupled to the processor and wherein the orientation module, when executed by the processor, further minimally causes the processor to:
receive orientation change data from the gyroscope; and
update the orientation indicator according to the orientation change data in order to improve the accuracy of the orientation indicator.

23. The computing-device of claim 17 wherein the gaze-monitoring-device comprises a camera-element and wherein the gaze module stored in the memory, when executed by the processor, minimally causes the processor to:
retrieve an image from the camera element and store the image in the memory; and
set a gaze-indictor in the memory when an eye is detected in the image and the eye is oriented toward a display included in the user interface device.

24. The computing-device of claim 23 wherein the gaze module, when executed by the processor, minimally causes the processor to:
retrieve an image from the camera element and store the image in the memory; and
set a gaze-indictor in the memory when an eye is detected in the image and the eye is oriented toward a display in the user interface device and when the image represents a face oriented toward the display included in the user interface device.

25. The computing-device of claim 17 wherein the gaze-monitoring-device comprises a hardware facial recognition device that is capable of perceiving an eye and providing a facial signature that indicates when the eye is directed toward a display included in the user interface and wherein the gaze module, when executed by the processor, minimally causes the processor to:
set a gaze indicator in the memory when a received facial signature indicates that an eye is directed toward the display.

26. The computing-device of claim 17 wherein the gaze-monitoring-device comprises a hardware facial recognition device that is capable of perceiving an eye, perceiving the orientation of a face and providing a facial signature that indicates when the eye is open and directed toward a display included and the face in directed toward the display and wherein the gaze module, when executed by the processor, minimally causes the processor to:
set a gaze indicator in the memory when a received facial signature indicates that an eye is directed toward the display and the received facial signature also indicates that a face is oriented toward the display.

27. The computing-device of claim 17 wherein the lock-out module, when executed by the processor, minimally causes the processor to clear the lock-out condition by:
retrieve the deviation angle from the memory; and
clear the lock-out-flag when the gaze indicator conforms to a pre-established condition and the deviation angle exceeds a pre-established value.

28. The computing-device of claim 17 further comprising:
network interface for communicating with a communications network and a protocol stack stored in the memory that, when executed by the processor, minimally causes the processor to establish a communication connection using the network interface when the lock-out flag stored in the memory is clear.

29. The computing-device of claim 17 further comprising:

Short-message-service application stored in the memory that, when executed by the processor, minimally causes the processor to send short message when the lock-out flag stored in the memory is clear.

30. The computing-device of claim 17 further comprising:

user interface driver stored in the memory that, when executed by the processor, minimally causes the processor to prevent usage of a user interface when the lock-out flag stored in the memory is set.

31. The computing-device of claim 17 further comprising:

user application stored in the memory that, when executed by the processor, minimally causes the processor to suspend execution of the user application when the lock-out flag stored in the memory is set.

* * * * *